United States Patent
Kaneko et al.

(10) Patent No.: US 8,658,964 B2
(45) Date of Patent: Feb. 25, 2014

(54) PHOTOELECTRIC ENCODER WITH OPTICAL GRATING

(75) Inventors: Emi Kaneko, Kanagawa (JP); Taizo Nakamura, Tokyo (JP); Tatsuya Nagahama, Kanagawa (JP); Atsushi Usami, Kanagawa (JP)

(73) Assignee: Mitutoyo Corporation, Kawasaki (JP)

( * ) Notice: Subject to any disclaimer, the term of this patent is extended or adjusted under 35 U.S.C. 154(b) by 703 days.

(21) Appl. No.: 12/909,079

(22) Filed: Oct. 21, 2010

(65) Prior Publication Data

US 2011/0095171 A1  Apr. 28, 2011

(30) Foreign Application Priority Data

Oct. 23, 2009 (JP) ................................. 2009-244121

(51) Int. Cl.
*G01D 5/34* (2006.01)
*G01D 5/36* (2006.01)

(52) U.S. Cl.
USPC ................... 250/231.13; 250/237 G

(58) Field of Classification Search
USPC ............. 250/221, 216, 231.1–231.18, 237 G; 356/614–617, 620, 621, 622; 359/436, 359/440; 33/1 R, 1 N, 1 M, 1 L, 1 SP, 1 PT
See application file for complete search history.

(56) References Cited

U.S. PATENT DOCUMENTS

| 4,948,968 | A * | 8/1990 | Matsui ...................... 250/237 G |
| 2005/0211885 | A1 * | 9/2005 | Tobiason et al. .......... 250/231.13 |
| 2007/0018084 | A1 * | 1/2007 | Shimomura et al. ...... 250/231.13 |

FOREIGN PATENT DOCUMENTS

| EP | 1 382 941 A1 | 1/2004 |
| JP | A-2004-264295 | 9/2004 |

OTHER PUBLICATIONS

Search Report issued in corresponding European Application No. 10013859.3 dated Mar. 23, 2011.

* cited by examiner

*Primary Examiner* — Pascal M Bui Pho
(74) *Attorney, Agent, or Firm* — Oliff PLC

(57) ABSTRACT

A photoelectric encoder in which light emitted from a light source is modulated by an optical grating and the modulated light is detected by a light receiving element, includes a one-side telecentric optical system which forms an image of the light modulated by the optical grating. The imaging optical system has an aperture through which part of the light modulated by the optical grating is allowed to transmit, the aperture having a size which is required when a cutoff spatial frequency that is a spatial frequency indicating a resolution limit of the imaging optical system due to the light emitted from the light source has a value between a fundamental spatial frequency of the optical grating obtained by a Fourier transformation and a second harmonic of the fundamental spatial frequency.

13 Claims, 14 Drawing Sheets

PHOTOELECTRIC ENCODER WITH OPTICAL GRATING

TECHNICAL FIELD

The present invention relates to a photoelectric encoder in which light emitted from a light source is modulated by an optical grating that is disposed on a scale at constant intervals, and the modulated light is detected by a light receiving element, and more particularly to a photoelectric encoder in which unwanted harmonic components from an optical grating are not detected, and only the fundamental spatial frequency due to constant intervals of the optical grating is detected, whereby the measurement position accuracy can be improved.

RELATED ART

Conventionally, a photoelectric encoder in which light emitted from a light source is modulated by an optical grating that is disposed on a scale at constant intervals, and the modulated light is detected by a light receiving element is used in various machine tools, measuring apparatuses, and the like.

In a photoelectric encoder disclosed in Patent Reference 1 (JP-A-2004-264295), for example, an image of an optical grating is formed on a light receiving surface of a light receiving element by using a telecentric optical system in which an aperture is placed in the focal point of a lens, thereby obtaining a relative position change of a scale with respect to the light receiving element.

Also in a telecentric optical system such as disclosed in Patent Reference 1, however, there exist specific MTF (Modulation Transfer Function) characteristics which define the contrast of a formed image of the optical grating. Depending on the selection of the MTF characteristics, an image of the optical grating may contain many high frequency components due to the optical grating itself, and cause the contrast of the image of the optical grating to be lowered and cause the distortion to be increased. In such a case, the accuracy of the position measurement is reduced.

SUMMARY

Exemplary embodiments provide a photoelectric encoder in which unwanted harmonic components from an optical grating are not detected, and only the fundamental spatial frequency due to constant intervals of the optical grating is detected, so that the position measurement is stabilized and the measurement position accuracy can be improved.

A photoelectric encoder according to a first aspect of the invention, includes:

a light source configured to emit light;

a scale having an optical grating that is disposed at constant intervals and being configured to modulate the light emitted from the light source by the optical grating;

a light receiving element configured to detect the light modulated by the optical grating; and an imaging optical system configured to form an image of the light modulated by the optical grating, wherein the imaging optical system has a first aperture through which part of the light modulated by the optical grating is allowed to transmit, the first aperture having a size which is required when a cutoff spatial frequency that is a spatial frequency indicating a resolution limit of the imaging optical system due to the light emitted from the light source has a value between a fundamental spatial frequency of the optical grating obtained by a Fourier transformation and a second harmonic of the fundamental spatial frequency.

A photoelectric encoder according to a second aspect of the invention, further includes:

an illumination optical system configured to illuminate the scale with the light emitted from the light source, wherein when a light source numerical aperture is smaller than a detection numerical aperture, the light source numerical aperture being based on a distance from the light source to the illumination optical system, and a size of the light source, the detection numerical aperture being based on a distance from the optical grating to the imaging optical system, and a size of the aperture, the cutoff spatial frequency has a value which is obtained by dividing the detection numerical aperture by a wavelength of the light.

A photoelectric encoder may further include:

an illumination optical system configured to illuminate the scale with the light emitted from the light source, wherein when a light source numerical aperture based on a distance from the light source to the illumination optical system, and a size of the light source is zero, the cutoff spatial frequency has a value which is obtained by dividing the detection numerical aperture by a wavelength of the light.

A photoelectric encoder according to a third aspect of the invention, further includes:

an illumination optical system configured to illuminate the scale with the light emitted from the light source, wherein when a light source numerical aperture based on a distance from the light source to the illumination optical system, and a size of the light source is larger than a detection numerical aperture based on a distance from the optical grating to the imaging optical system, and a size of the first aperture, the cutoff spatial frequency has a value which is obtained by dividing a double of the detection numerical aperture by a wavelength of the light.

In a photoelectric encoder according to a fourth aspect of the invention, in accordance with an error angle which is produced by a placement error of the scale with respect to an optical axis of the imaging optical system, the distance from the light source to the illumination optical system is shortened, or the size of the light source is increased.

In a photoelectric encoder according to a fifth aspect of the invention, the illumination optical system includes a second aperture plate having a second aperture through which part of the light emitted from the light source is allowed to transmit, or an illumination lens configured to deflect the light.

In a photoelectric encoder according to a sixth aspect of the invention, the light source is placed on a same side as the imaging optical system with respect to the scale, and the imaging optical system forms an image of light reflected by the scale.

In a photoelectric encoder according to a seventh aspect of the invention, the imaging optical system includes a first aperture plate in which the first aperture is disposed.

In a photoelectric encoder according to an eighth aspect of the invention, the imaging optical system includes at least one imaging lens configured to deflect light modulated by the optical grating.

In a photoelectric encoder according to a ninth aspect of the invention, the imaging optical system is formed as a one-side telecentric optical system in which the first aperture of the one first aperture plate is placed at a focal position of the one imaging lens on an optical axis.

In a photoelectric encoder according to a tenth aspect of the invention, the imaging optical system is formed as a both-side telecentric optical system in which the first aperture of the one first aperture plate is placed at a focal position between the two imaging lenses on an optical axis.

According to the invention, unwanted harmonic components from an optical grating are not detected, and only the fundamental spatial frequency due to constant intervals of the optical grating is detected, so that the position measurement is stabilized and the measurement position accuracy can be improved.

DETAILED DESCRIPTION

Hereinafter, an example of an embodiment of the invention will be described in detail.

First, the configuration of a photoelectric encoder which is a first embodiment will be described with reference to FIGS. 1 and 2.

Figure 1:
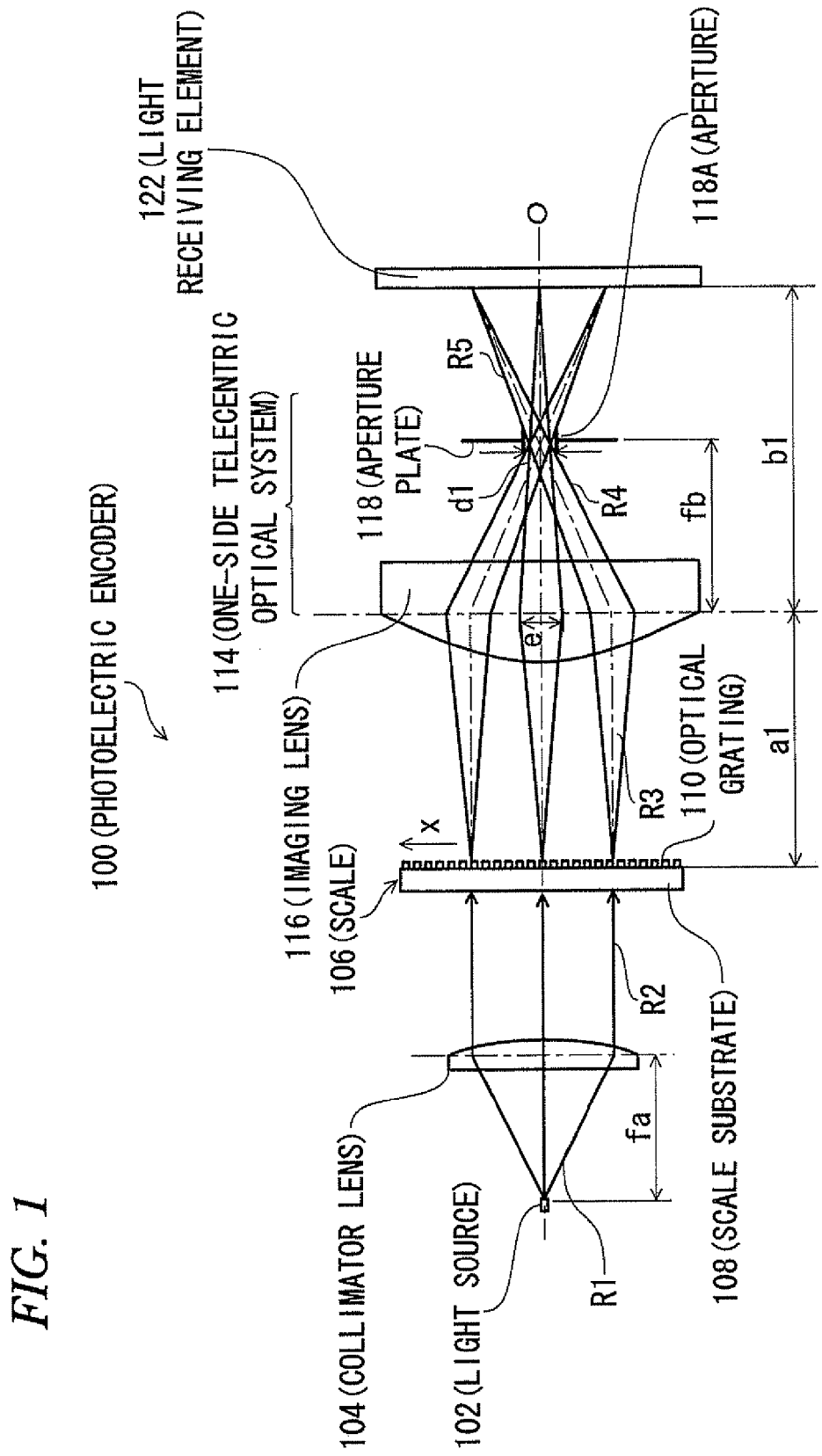
FIG. 1 is a schematic view showing a photoelectric encoder according to a first embodiment of the invention.

As shown in FIG. 1, the photoelectric encoder 100 includes: a light source 102; a collimator lens 104 functioning as an illumination optical system; a scale 106; a one-side telecentric optical system 114 functioning as an imaging optical system; and a light receiving element 122.

As shown in FIG. 1, the light source 102 is a point light source. The collimator lens 104 (illumination lens) deflects light R1 emitted from the light source 102 which is placed at the position of the focal length fa of the lens, to form a parallel light beam R2 which impinges on the scale 106. In the light R2, therefore, its light fluxes are completely parallel to one another, and hence the configuration extending from the light source 102 to the collimator lens 104 is referred to as the parallel light source. Since the light source 102 has no size, the numerical aperture $NA_{light}$ (referred to as the light source numerical aperture) based on the distance fa from the light source 102 to the collimator lens 104, and the size of the light source 102 is zero ($NA_{light}=0$).

Figure 2:
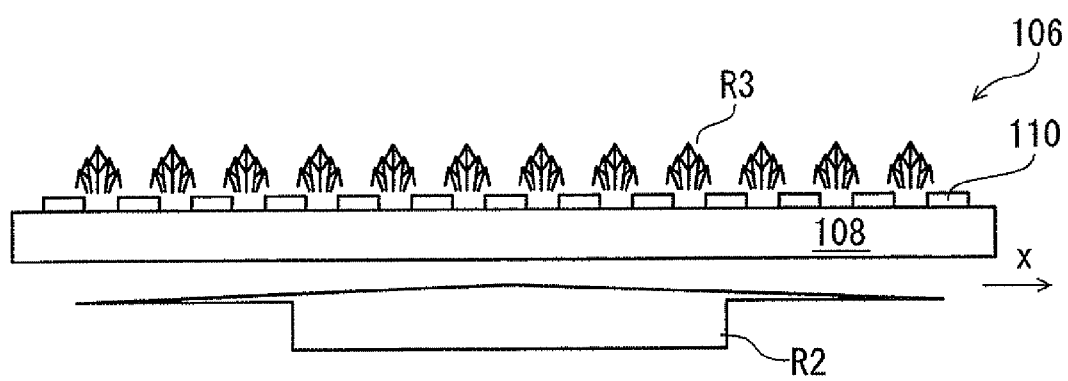
FIG. 2 is a schematic view showing a scale according to the first embodiment.

As shown in FIG. 2, the scale 106 has a scale substrate 108, and an optical grating 110 which is disposed on the scale substrate 108 at constant intervals in the measurement axis direction X. The scale substrate 108 is made of a material which is optically transparent, such as glass. The optical grating 110 is shaped by, for example, performing a lithography process on a thin film which is formed on the scale substrate 108, and which is made of a metal that is optically opaque, such as chromium. When the light R2 impinges on the scale 106, therefore, the light R2 advances through the scale substrate 108 to transmit through gaps of the optical grating 110 (the light R2 is modulated by the optical grating 110 to be formed as modulated light R3).

As shown in FIG. 1, the one-side telecentric optical system 114 has an imaging lens 116 and an aperture plate 118. The imaging lens 116 deflects the light R3 modulated by the optical grating 110. The aperture plate 118 includes an aperture 118A through which part of light R4 that is formed by deflecting the light R3 modulated by the optical grating 110, by the imaging lens 116 is allowed to transmit. The aperture 118A is placed at the position of the focal length fb of the imaging lens 116 on the optical axis O. In the one-side telecentric optical system 114, even when the distance between the imaging lens 116 and the optical grating 110 is slightly varied, therefore, the magnification of the image which is formed by the imaging lens 116 is not varied. That is, even when the distance between the imaging lens 116 and the scale 106 is slightly varied in a mounting step, accurate position measurement can be maintained.

When the beam diameter of light R5 which transmits through the aperture 118A, on the imaging lens 116 is indicated by e, the distance between the optical grating 110 and the imaging lens 116 is indicated by a1, and that between the imaging lens 116 and the light receiving surface of the light receiving element 122 is indicated by b1, the numerical aperture $NA_{opt}$ (referred to as the detection numerical aperture) based on the distance from the optical grating 110 to the one-side telecentric optical system 114, and the size d1 of the aperture 118A can be arranged as in Expression (1):

$$NA_{opt} = \sin\{\tan^{-1}(e/2 \cdot a1)\}$$

When $e \ll a1$, $$NA_{opt} \approx (1/2) \cdot (e/a1) \quad (1)$$
$$\approx d1/(2 \cdot fb)$$

The relationship between the detection numerical aperture $NA_{opt}$ and the light source numerical aperture $NA_{light}$ can be summarized and expressed by Expression (2):

$$NA_{light}=0, NA_{light}<NA_{opt} \quad (2)$$

The light receiving element 122 is an array sensor having a plurality of light receiving regions which are arranged in the measurement axis direction X. For example, a photodiode array or the like may be used as the light receiving element 122. When the light receiving regions of the light receiving element 122 are swept in the measurement axis direction X, therefore, the image of the optical grating 110 which is formed on the light receiving surface of the light receiving element 122 can be recognized as at least an image in the measurement axis direction X. As a result, it is possible to accurately measure a relative position change of the scale 106 with respect to the light receiving element 122 in the measurement axis direction X. In the embodiment, the magnification factor of the optical grating 110 can be easily changed by changing the ratio of the distance a1 to the distance b1. Even when the scale is replaced with another one including an optical grating having different intervals, therefore, the light receiving element 122 can be commonly used.

Next, the procedure of determining the size d1 of the aperture 118A of the aperture plate 118 will be described below.

Figure 3:
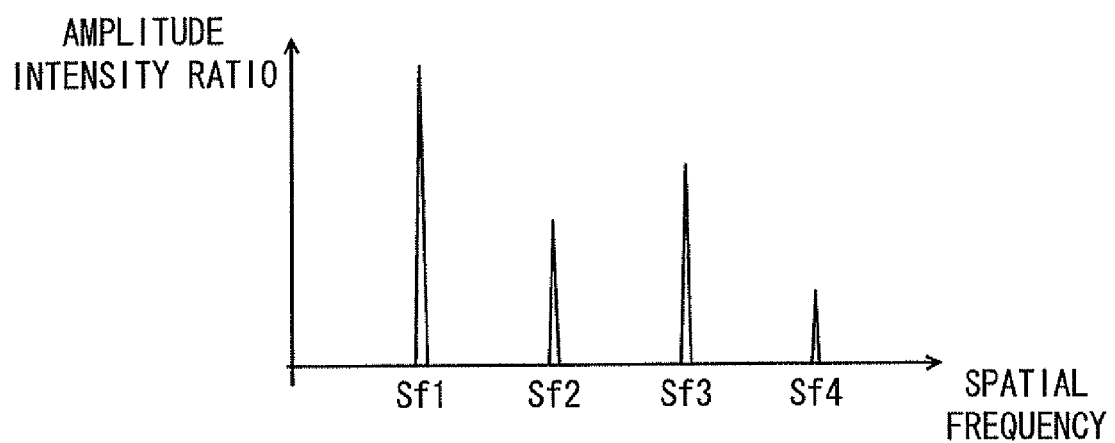
FIG. 3 is a graph showing a spatial frequency component after Fourier-transformation of an optical grating according to the first embodiment.

When the optical grating 110 of the scale 106 is Fourier-transformed, a high amplitude intensity can be observed at the position of the fundamental spatial frequency Sf1 of the optical grating 110 as shown in FIG. 3 because the optical grating 110 has the constant intervals. In this case, however, the second harmonic Sf2, the third harmonic Sf3, the fourth harmonic Sf4, and the like are simultaneously observed at the positions of the double, triple, and quadruple spatial frequencies of the fundamental spatial frequency Sf1, respectively. In the embodiment, when the size d1 of the aperture 118A is optimally selected, therefore, high frequency components of the second harmonic Sf2 or higher are eliminated.

Figure 4A:
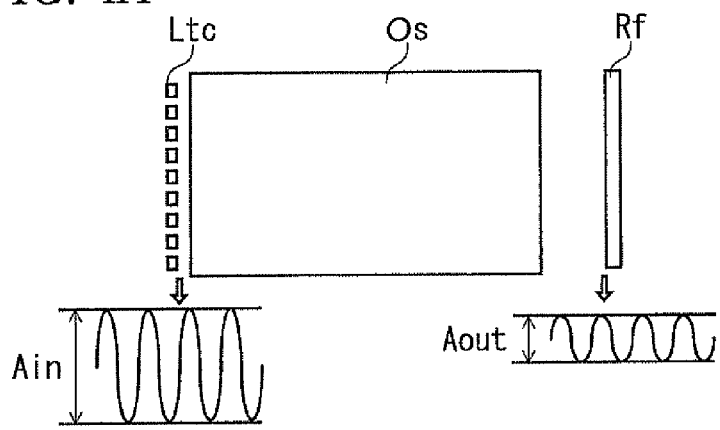
FIG. 4A is a schematic view explaining a MTF characteristics.

In order to realize the above, MTF (Modulation Transfer Function) characteristics showing the imaging characteristics of the one-side telecentric optical system 114 in the embodiment are obtained. As shown in FIG. 4A, when a sinusoidal grating Ltc of an amplitude intensity Ain is imaged by an optical system Os, usually, an image of the sinusoidal grating Ltc which is obtained on an imaging surface Rf is obtained at an amplitude intensity Aout. In this case, the MTF characteristics of the optical system Os is obtained by the ratio of the amplitude intensities (Expression (3)):

$$MTF = Aout/Ain \quad (3)$$

Figure 4B:
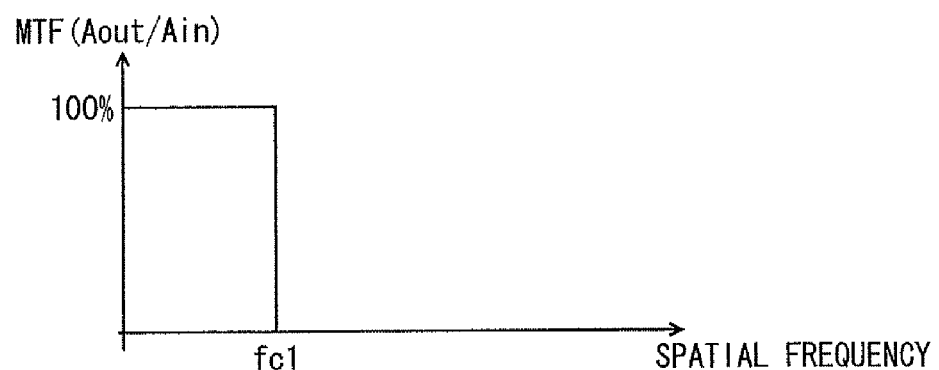
FIG. 4B is a graph showing the MTF characteristics in the embodiment.

In the embodiment, the parallel light source is used. As shown in FIG. 4B, therefore, the graph showing the MTF characteristics is indicated by a rectangular, and the amplitude intensity ratio is steeply changed at a spatial frequency fc1 (referred to as the cutoff spatial frequency), and becomes zero. Namely, the cutoff spatial frequency fc1 indicates the resolution limit of the one-side telecentric optical system 114 due to the light R1 emitted from the light source 102 (or, the contrast of an image fowled by the one-side telecentric optical system 114 at the cutoff spatial frequency fc1 is zero (in this context, "the contrast is zero" includes a case where only a contrast of a level at which the contrast cannot be observed is obtained)). When the wavelength of light is indicated by λ, the cutoff spatial frequency fc1 is shown by Expression (4). fc1 indicates the cutoff spatial frequency when the parallel light is irradiated, and is indicated as the value of a spatial frequency which is a half of the optical cutoff frequency fc (=2 $NA_{opt}/\lambda$) when the light that is not the parallel light is irradiated.

$$fc1 = NA_{opt}/\lambda \quad (4)$$

Figure 4C:
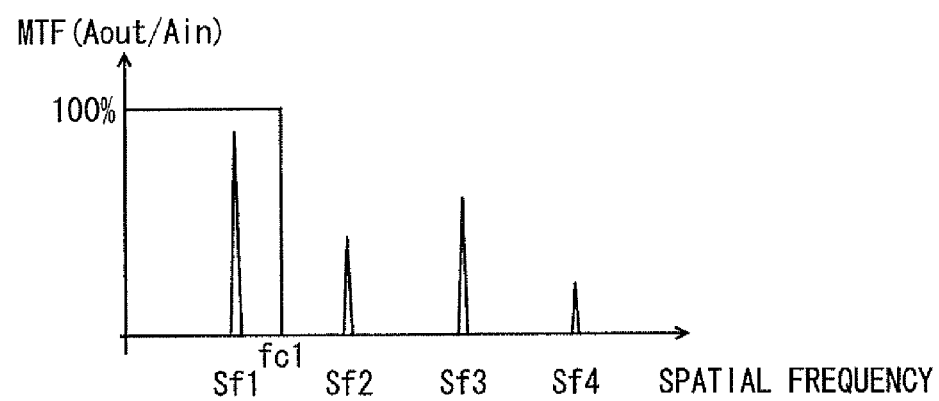
FIG. 4C is a graph showing a relationship between the MTF characteristics and the spatial frequency component after Fourier-transformation of the optical grating in the embodiment.

In the embodiment, therefore, the cutoff spatial frequency fc1 is set to a value between the fundamental spatial frequency Sf1 and the second harmonic Sf2 as shown in FIG. 4C (Expression (5)).

$$Sf1 < fc1 < Sf2 \quad (5)$$

Namely, the size d1 of the aperture 118A is obtained as Expression (6) from Expressions (1), (4), and (5), whereby high frequency components of the second harmonic Sf2 or higher can be prevented from affecting the image of the optical grating 110 due to the fundamental spatial frequency Sf1.

$$2 \cdot \lambda \cdot fb \cdot Sf1 < d1 < 2 \cdot \lambda \cdot fb \cdot Sf2 \quad (6)$$

Calculations will be performed by using specific values. When the intervals of the optical grating 110 are 10 μm (the fundamental spatial frequency Sf1 is 1/(10 μm), and the second harmonic Sf2 is 1/(5 μm)), the wavelength λ is 660 nm, and the focal length fb of the imaging lens 116 is 10 mm, the size d1 of the aperture 118A is obtained from Expression (6), as Expression (7):

$$1.32 \text{ mm} < d1 < 2.64 \text{ mm} \quad (7)$$

The above specific values are mere examples, and other values may be used.

Next, the operation of the photoelectric encoder 100 of the embodiment will be described with reference to FIG. 1.

First, the light R1 emitted from the light source 102 is deflected by the collimator lens 104 to be formed as the parallel light R2. The light R2 is incident on the scale 106 to be modulated by the optical grating 110. The modulated light R3 is incident on the imaging lens 116 of the one-side telecentric optical system 114 to be deflected. The deflected light R4 passes through the aperture 118A of the aperture plate 118. The passed light R5 forms an image on the light receiving surface of the light receiving element 122. In the fanned image of the optical grating 110, high frequency components of the second harmonic Sf2 or higher of the optical grating 110 are eliminated. Therefore, no light and dark pattern due to high frequency components other than that due to the fundamental spatial frequency Sf1 exists. In the embodiment, at the same time, a high MTF value (high contrast ratio) is attained with respect to the fundamental spatial frequency Sf1 as shown in FIG. 4C, and hence the light and dark pattern due to the fundamental spatial frequency Sf1 is imaged at a high contrast. Therefore, a light and dark pattern signal detected by the light receiving element 122 is processed in a processing system which is not shown, and the relative position change of the scale 106 is accurately calculated.

Namely, unwanted harmonic components from the optical grating 110 are not detected by the light receiving element 122, and only the fundamental spatial frequency due to the constant intervals of the optical grating 110 is detected, so that the position measurement is stabilized and the measurement position accuracy can be improved.

In the embodiment, the photoelectric encoder 100 is of the transmission type, and the use efficiency of the light R1 emitted from the light source 102 is high. Therefore, the position measurement can be performed more stably.

Figure 5:
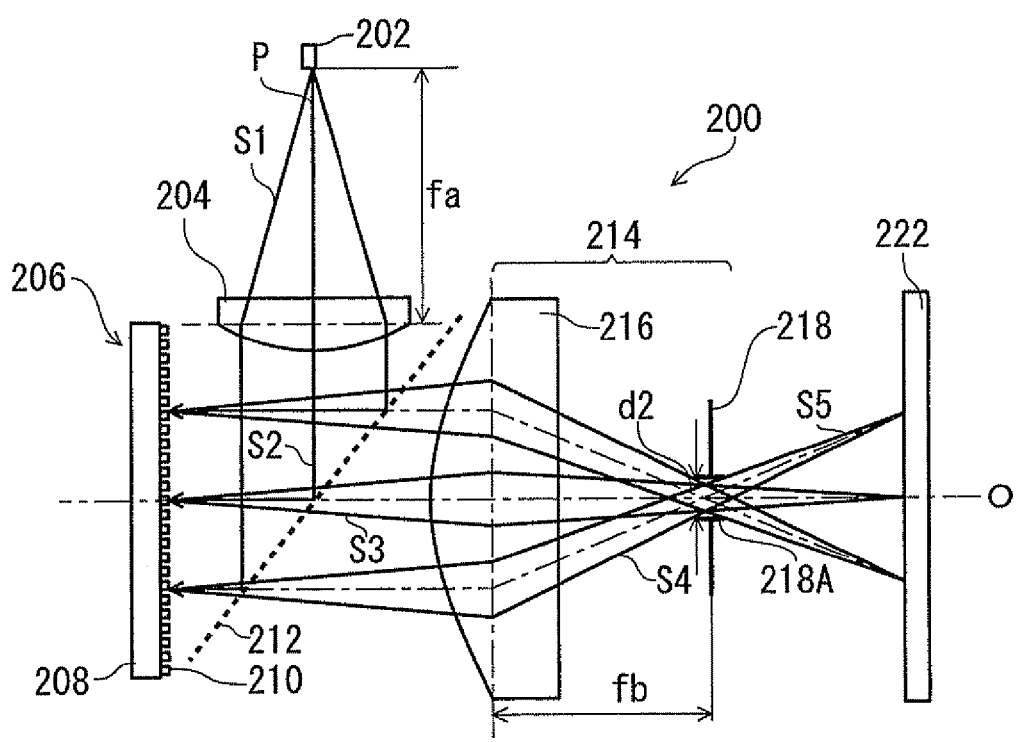
FIG. 5 is a schematic view showing a photoelectric encoder according to a second embodiment of the invention.

Next, a second embodiment of the invention will be described with reference to FIGS. 5 and 6.

In contrast to the first embodiment in which the photoelectric encoder 100 is of the transmission type, the photoelectric encoder 200 of the embodiment is of the reflection type. Namely, a light source 202 is placed on the same side as a one-side telecentric optical system 214 with respect to a scale 206, and the one-side telecentric optical system 214 forms an image of light S3 reflected by the scale 206.

In the embodiment, a half minor 212 is inserted on the optical axis O, and the scale 206 of the reflection type is used. Hereinafter, the embodiment will be specifically described.

The half mirror 212 is inserted at an angle of 45 deg. on the optical axis O between the scale 206 and an imaging lens 216. Therefore, light S1 which is emitted from the light source 202 in a direction P that is perpendicular to the optical axis O can be deflected by a collimator lens 204 to be formed as a parallel light beam, and then caused to be incident on the scale 206.

Figure 6:
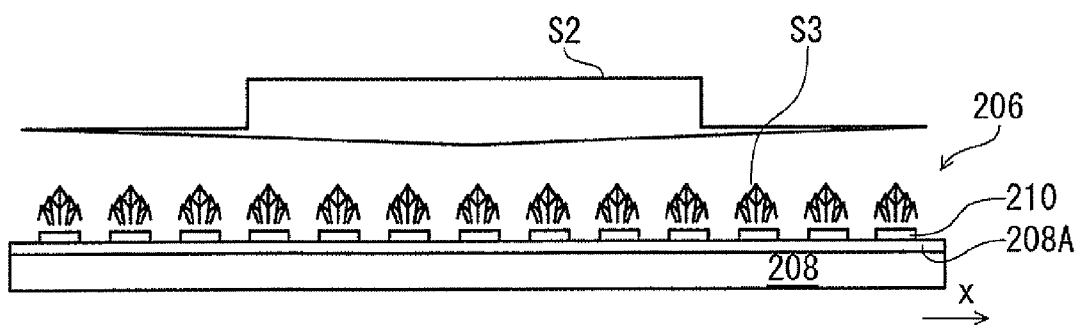
FIG. 6 is a schematic view showing a scale according to the second embodiment.

As shown in FIG. 6, the scale 206 has a scale substrate 208, a light absorbing film 208A, and an optical grating 210 which is disposed on the light absorbing film 208A at constant intervals in the measurement axis direction X. The scale substrate 208 is made of a material which is optically opaque, such as a metal. The light absorbing film 208A is a film which does not reflect incident light, but absorbs the light, and uniformly formed on the scale substrate 208. The optical grating 210 is shaped by, for example, performing a lithography process on a thin film which is formed on the scale substrate 208, and which is made of a metal that is optically opaque, and that has a high light reflectivity, such as chromium. When the light R2 impinges on the scale 206, therefore, the light is reflected by the surface (i.e., the scale 206) of the optical grating 210 (the light R2 is modulated by the optical grating 210 to be formed as modulated light R3).

In the embodiment, the light source 202 and the one-side telecentric optical system 214 are configured in the same manner as those of the first embodiment. Similarly with the first embodiment, therefore, the size d2 (=d1) of an aperture 218A can be obtained from Expression (6). When the specific values including the intervals of the optical grating 210 of the scale 206 are set equal to those of the first embodiment, namely, the size d2 of the aperture 218A can be obtained by Expression (8):

$$1.32 \text{ mm} < d2 < 2.64 \text{ mm} \tag{8}$$

Since the photoelectric encoder 200 of the embodiment is of the reflection type, the degree of freedom in mounting on a partner machine apparatus is high. The embodiment employs the one-side telecentric optical system 214 in which the magnification is not changed even when the scale 206 is shifted in the direction of the optical axis O. Therefore, the embodiment has an advantage that strictness is not required in mounting of the scale 106 on a partner machine apparatus.

Next, a third embodiment of the invention will be described with reference to FIGS. 7, 8A and 8B. The embodiment is different from the first embodiment in that a light source 302 has a predetermined size, but identical with the first embodiment in the other points. Hereinafter, the embodiment will be specifically described.

Figure 7:
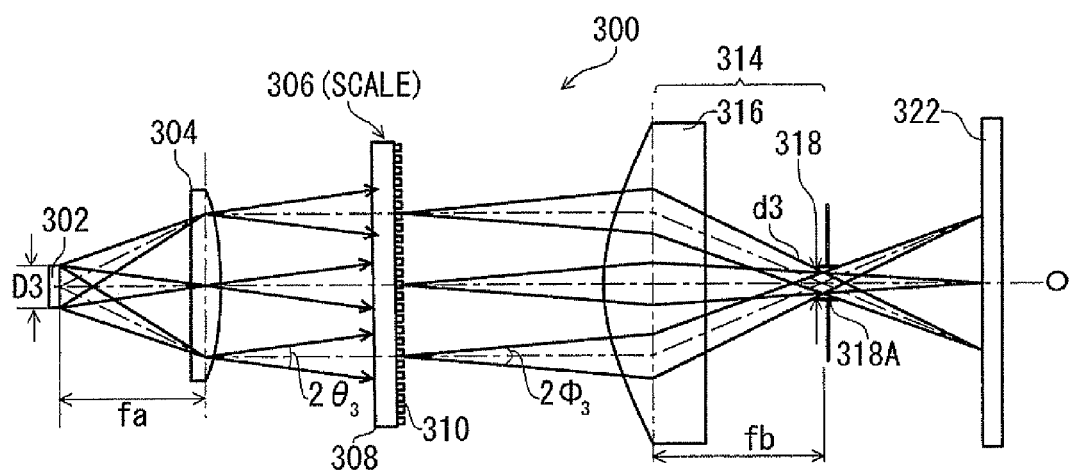
FIG. 7 is a schematic view showing a photoelectric encoder according to a third embodiment of the invention.
Figure 8A:
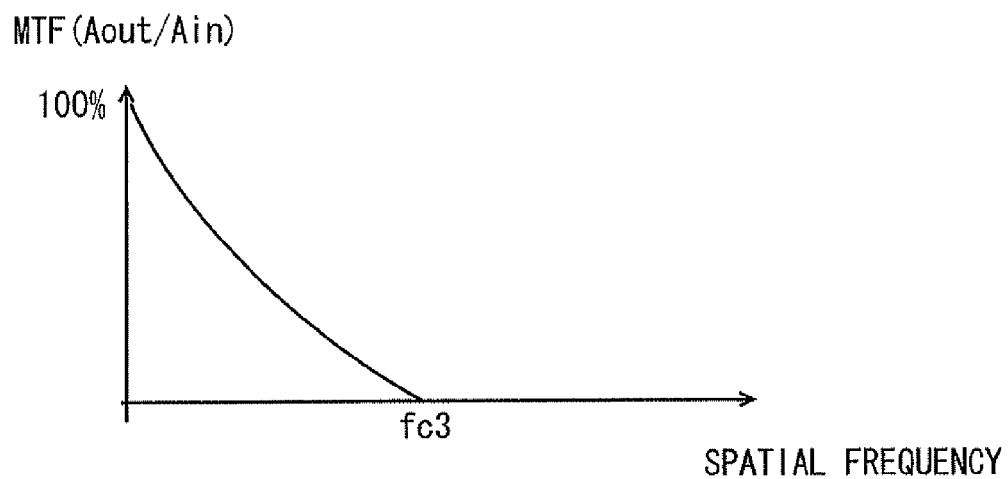
FIG. 8A is a graph showing a MTF characteristics in the third embodiment.
Figure 8B:
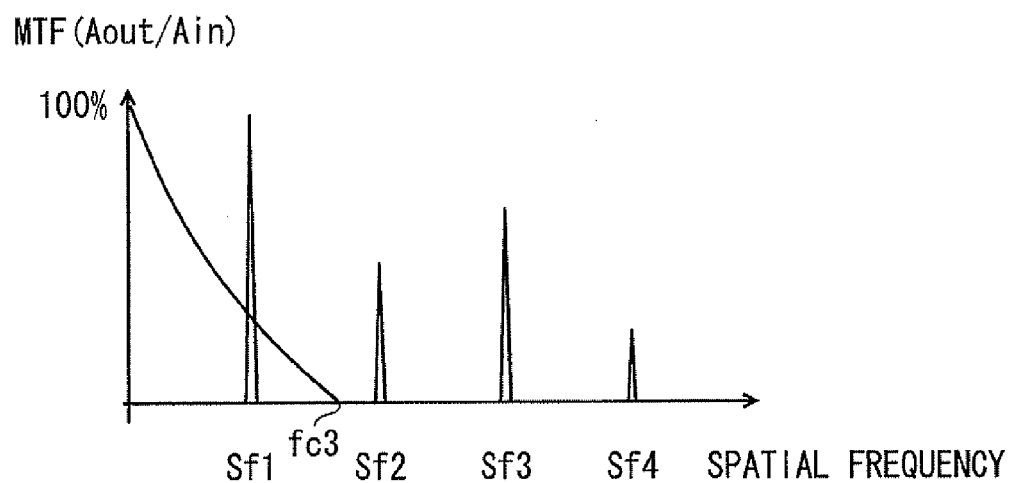
FIG. 8B is a graph showing a spatial frequency component after Fourier-transformation of an optical grating according to the third embodiment.
Figure 9:
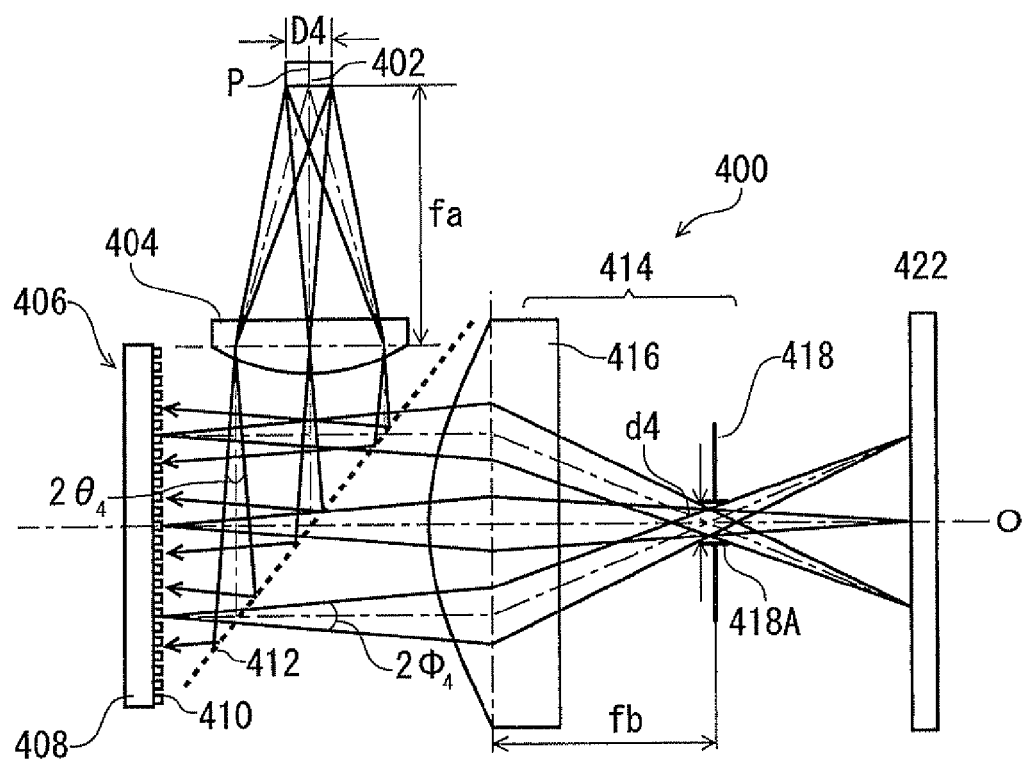
FIG. 9 is a schematic view showing a photoelectric encoder according to a fourth embodiment of the invention.

As shown in FIG. 7, the light source 302 has a size D3. A collimator lens 304 (illumination lens) deflects light emitted from a light source 302 which is placed at the position of the focal length fa of the lens, to cause the light to impinge on a scale 306. Therefore, the light which is deflected by the collimator lens 304 is not formed as completely parallel light beams. Here, the light source numerical aperture $NA_{light}$ is defined by Expression (9):

$$NA_{light} = \sin\{\tan^{-1}(D3/2 \cdot fa)\}$$

When D3≪fa, $$NA_{light} \approx D3/(2 \cdot fa) \tag{9}$$

When the light source numerical aperture $NA_{light}$ is larger than the detection numerical aperture $NA_{opt}$ defined by Expression (1), the configuration formed by the light source 302 and the collimator lens 304 is referred to as the diffusion light source. Namely, the condition of the diffusion light source can be indicated by Expression (10):

$$NA_{light} > NA_{opt} \tag{10}$$

Therefore, the divergence angle (referred to as the light source light flux angle) $\theta_3$ of the light incident on the scale 306 is larger than the divergence angle (referred to as the detection light flux angle) $\phi_3$ of the light incident from the scale 306 on an imaging lens 316 (Expression (11)).

$$\theta_3 > \phi_3 \tag{11}$$

Next, the procedure of determining the size d3 of an aperture 318A of an aperture plate 318 will be described below.

When the optical grating 310 of the scale 306 is Fourier-transformed, spatial frequency components which are similar to those of the first embodiment are obtained as shown in FIG. 3. Also in the embodiment, when the size d3 of the aperture 318A is optimally selected, therefore, high frequency components of the second harmonic Sf2 or higher can be eliminated.

In order to realize the above, MTF (Modulation Transfer Function) characteristics showing the imaging characteristics of a one-side telecentric optical system 314 in the embodiment are obtained. In the embodiment, the diffusion light source is used. In the graph showing the MTF characteristics, as shown in FIG. 8A, therefore, the value is gradually lowered from the state of 100%, and the amplitude intensity ratio is zero at a spatial frequency fc3 (referred to as the cutoff spatial frequency). Namely, the cutoff spatial frequency fc3 indicates the resolution limit of the one-side telecentric optical system 314 due to the light emitted from the light source 302 (or, the contrast of an image formed by the one-side telecentric optical system 314 at the cutoff spatial frequency fc3 is zero (in this context, "the contrast is zero" includes a case where only a contrast of a level at which the contrast cannot be observed is obtained)). When the wavelength of light is indicated by λ, the cutoff spatial frequency fc3 is shown by Expression (12) (the cutoff spatial frequency fc3 has a value which is equal to the optical cutoff frequency fc (=2·$NA_{opt}$/λ)).

$$fc3 = 2 \cdot NA_{opt}/\lambda \tag{12}$$

Therefore, the cutoff spatial frequency fc3 is set to a value between the fundamental spatial frequency Sf1 and the second harmonic Sf2 as shown in FIG. 5B (Expression (13)).

$$Sf1 < fc3 < Sf2 \tag{13}$$

Namely, the size d3 of the aperture 318A is obtained as Expression (14) from Expressions (1), (12), and (13), whereby high frequency components of the second harmonic Sf2 or higher can be prevented from affecting the image of the optical grating 310 due to the fundamental spatial frequency Sf1.

$$\lambda \cdot fb \cdot Sf1 < d3 < \lambda \cdot fb \cdot Sf2 \tag{14}$$

Calculations will be performed by using specific values. When the intervals of the optical grating 310 are 10 µm (the fundamental spatial frequency Sf1 is 1/(10 µm), and the second harmonic Sf2 is 1/(5 µm)), the wavelength λ is 660 nm, and the focal length fb of the imaging lens 316 is 10 mm, the size d3 of the aperture 318A is obtained from Expression (14), as Expression (15):

$$0.66 \text{ mm} < d3 < 1.32 \text{ mm} \tag{15}$$

Also the relationship of Expression (16) can be obtained from Expressions (12) and (13):

$$0.033 < NA_{opt} < 0.066 \tag{16}$$

The above specific values are mere examples, and other values may be used.

Also in the embodiment, when the size d3 of the aperture 318A satisfies the above conditions, therefore, unwanted harmonic components from the optical grating 310 can be eliminated, and the image of the optical grating 310 can be detected at a suitable contrast according to the MTF value.

Next, a fourth embodiment of the invention will be described with reference to FIGS. 9, 10A, 10B and 10C.

In contrast to the third embodiment in which the photoelectric encoder 300 is of the transmission type, the photoelectric encoder 400 of the embodiment is of the reflection type. Namely, the embodiment is different in a light source 402 from the photoelectric encoder 200 of the second embodiment, and the light source 402 is set to have the same conditions as the light source 302 in the third embodiment. Hereinafter, the embodiment will be described in detail.

Also in the embodiment, a diffusion light source is configured by the light source 402 and a collimator lens 404. Similarly with the third embodiment, namely, Expression (10) holds.

That is, the light source light flux angle $\theta_4$ is larger than the detection light flux angle $\phi_4$ (Expression (17)).

$$\theta_4 > \phi_4 \quad (17)$$

In a similar manner as the third embodiment, therefore, the size d4 (=d3) of an aperture 418A can be obtained from Expression (18) based on Expression (14).

$$\lambda \cdot fb \cdot Sf1 < d4 < \lambda \cdot fb \cdot Sf2 \quad (18)$$

Figure 10A:
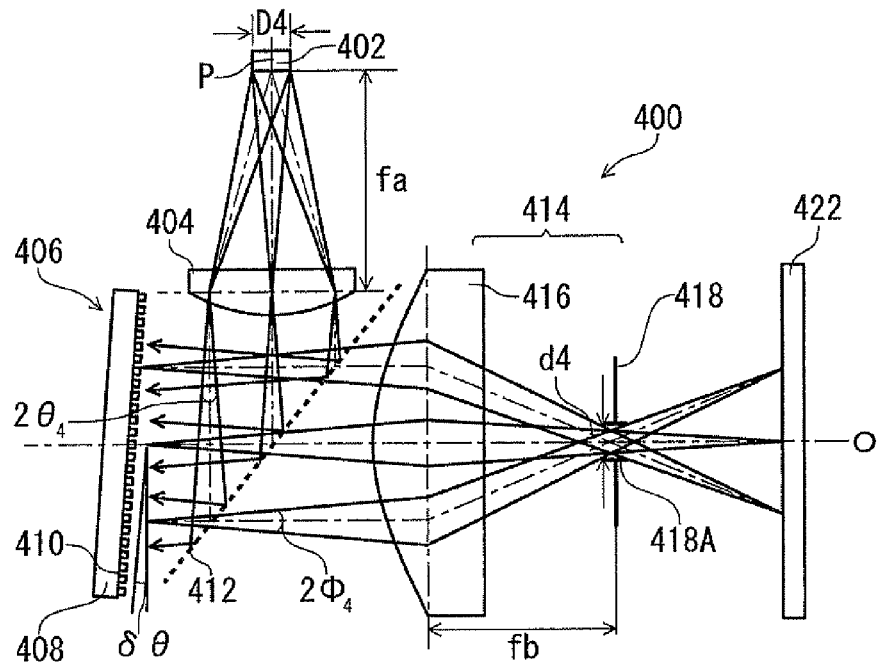
FIGS. 10A to 10C are schematic views showing a photoelectric encoder in a case where the scales are inclined according to the fourth embodiment.

Next, the case where a placement error of a scale 406 occurs with respect to the optical axis O of a one-side telecentric optical system 414 will be described, In the embodiment, in the case where the scale 406 is mounted on a partner machine in a state where, because of the placement error of the scale 406 with respect to the optical axis O, the scale 406 is inclined by an error angle $\delta\theta$ as shown in FIG. 10A, the light source numerical aperture $NA_{light}$ is increased in accordance with the inclination error angle $\delta\theta$, whereby the position measurement can be stabilized.

Figure 10B:
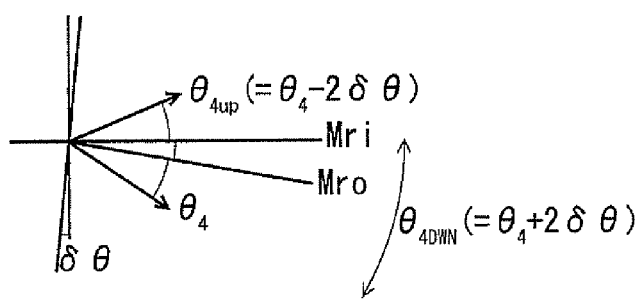
Figure 10C:
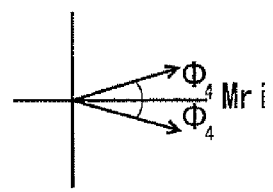

When the error angle $\delta\theta$ is produced in the scale 406, as shown in FIG. 10B, light (referred to as the incident main light beam) Mri which is originally incident perpendicularly on the scale 406 is reflected to be formed as light (referred to as the emission main light beam) Mro which is inclined by $2\cdot\delta\theta$. Therefore, the light source light flux angle is indicated by two angles; one is $\theta_{4UP}$ which is a flux angle at an upper side with respect to Mri, the other is $\theta_{4DWN}$ which is a flux angle at a lower side with respect to Mri in FIG. 10B, when the incident main light beam Mri is considered as a reference. On the other hand, as shown in FIG. 10C, the detection flux angle is indicated by two angles of $\phi_4$ at both sides when Mri is considered as a reference. Therefore, $\theta_{4UP}$ and $\theta_{4DWN}$ must have values larger than that of $\phi_4$, respectively and must satisfy Expressions (19) and (20).

$$\theta_{4UP} = \theta_4 - 2\cdot\delta\theta > \phi_4 \quad (19)$$

$$\theta_4 > \phi_4 + 2\cdot\delta\theta \quad (20)$$

Please note that when Expressions (19) and (20) are developed, it is necessary to compare $\phi_4$ with the smaller flux angle of $\theta_{4UP}$ and $\theta_{4DWN}$. In this embodiment, based on FIG. 10B, $\phi_4$ is compared with $\theta_{4UP}$ which is a smaller angle.

Here, the light source numerical aperture $NA_{light} = \sin\theta_4$, and the size D4 (=D3) of the light source 402 is obtained from Expression (9) (Expression (21)).

$$D4 > 2\cdot fa\cdot\sin(\phi_4 + 2\delta\theta) \quad (21)$$

Calculations will be performed by using specific values. When the intervals of the optical grating 410 are 10 μm (the fundamental spatial frequency Sf1 is 1/(10 μm), and the second harmonic Sf2 is 1/(5 μm)), the wavelength 2 is 660 nm, the range of the detection numerical aperture $NA_{opt}$ indicated by Expression (16) is obtained. When the detection numerical aperture $NA_{opt}$ is 0.061, the detection light flux angle $\phi_4$ is 3.5 deg. When the error angle $\delta\theta$ is 0.1 deg., Expression (21) can be expressed by Expression (22):

$$D4 > 2\cdot fa\cdot 0.065 \quad (22)$$

When the error angle $\delta\theta$ is 0, Expression (21) can be expressed by Expression (23):

$$D4 > 2\cdot fa\cdot 0.061 \quad (23)$$

Namely, the size D4 of the light source 402, or the focal length fa is determined so that Expression (22) is satisfied.

The above specific values are mere examples, and other values may be used.

In the embodiment, as described above, the scale 406 is formed as a separate member, and mounted on the partner machine. Therefore, the inclination error $\delta\theta$ easily occurs. In this case, Expressions (22) and (23) are compared to each other, and, in accordance with the error angle $\delta\theta$, the size D4 of the light source 402 is increased, or the distance (the focal length fa) between the light source 402 and the collimator lens 404 is shortened. Namely, the state of the diffusion light source can be maintained by increasing the light source numerical aperture $NA_{light}$, and stabilized position measurement is enabled.

In the case where the light source has a size as described above, the configuration is not restricted to the embodiment, and a design in which the light source numerical aperture $NA_{light}$ is made large may be applied to the photoelectric encoder 300 of the transmission type of the third embodiment.

Although the invention has been described with preferred embodiments, the invention is not limited to the embodiments. It is a matter of course that improvements and design changes can be made without departing from the spirit of the invention.

Figure 11:
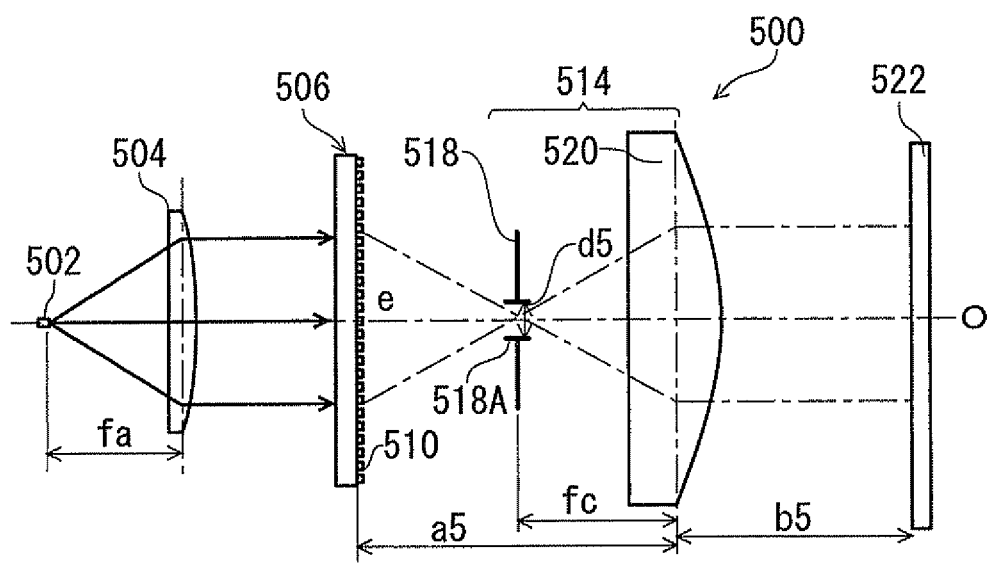
FIG. 11 is a schematic view showing a photoelectric encoder according to a fifth embodiment of the invention.

In the above-described embodiments, for example, the one-side telecentric optical system for a scale is used as an imaging optical system. However, the invention is not limited to this. As in a fifth embodiment shown in FIG. 11, for example, a one-side telecentric optical system 514 for a light receiving element may be employed as an imaging optical system. In this case, even when the distance between an imaging lens 520 and the light receiving surface of the light receiving element 522 is slightly varied, the magnification of the image which is formed by the imaging lens 520 is not varied. Namely, even when mounting of the light receiving element 522 and the imaging lens 520 is slightly varied, accurate position measurement can be maintained. When the focal length of the imaging lens 520 is fc, the detection numerical aperture $NA_{opt}$ is expressed by Expression (24):

$$NA_{opt} = d5/(2\cdot(a5 - fc)) \quad (24)$$

Figure 12:
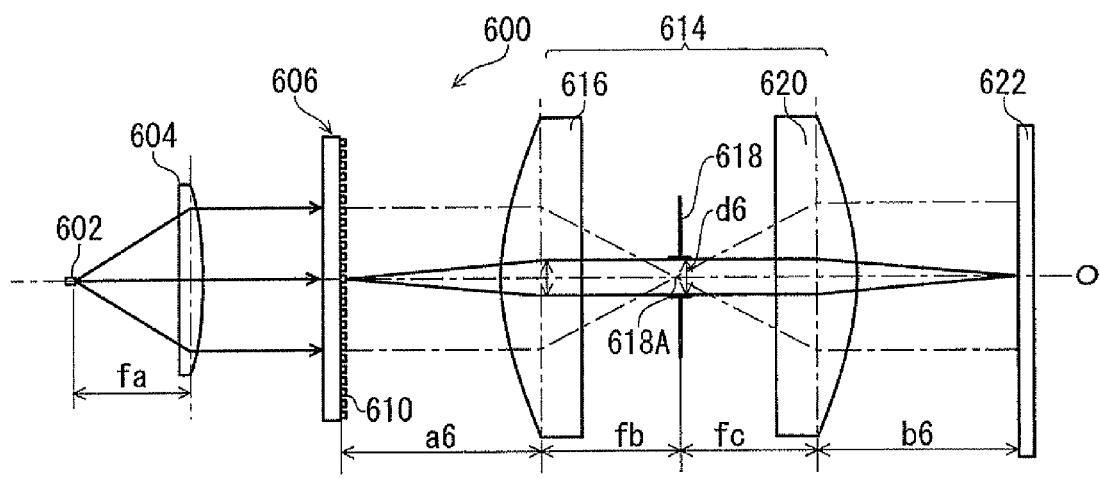
FIG. 12 is a schematic view showing a photoelectric encoder according to a sixth embodiment of the invention.

As shown in a sixth embodiment of FIG. 12, a both-side telecentric optical system 614 in which an aperture 618A of an aperture plate 618 is placed at the focal positions of imaging lenses 616, 620 on the optical axis O may be employed as an imaging optical system. In this case, even when the distance between the imaging lens 616 and an optical grating 610 is slightly varied, the magnification of the image which is formed by the imaging lens 616 is not varied. Furthermore, even when the distance between the imaging lens 620 and the light receiving surface of a light receiving element 622 is slightly varied, the magnification of the image which is formed by the imaging lens 620 is not varied. Namely, even when the distance between the imaging lens 616 and a scale 606 is slightly varied in a step of mounting the photoelectric encoder 600 on a partner machine, and further the mounting between the light receiving element 622 and the imaging lens 620 is slightly varied, accurate position measurement can be maintained. The detection numerical aperture $NA_{opt}$ is expressed by Expression (25):

$$NA_{opt}=d6/(2 \cdot a6) \quad (25)$$

Figure 14:
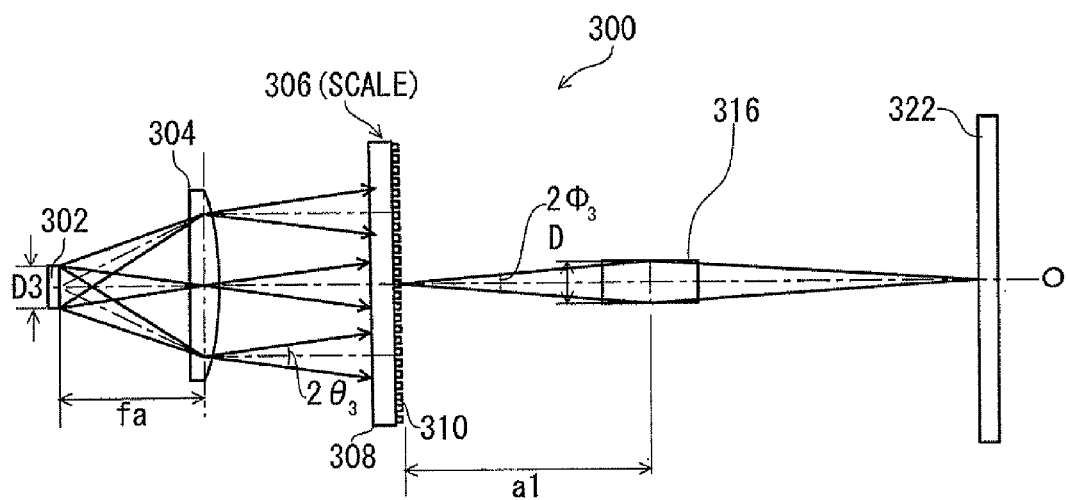
FIG. 14 is a schematic view showing a photoelectric encoder according to a modified example of the invention in the case where an aperture plate is not used.

In the above-described embodiments, the aperture plate is placed at the focal position. However, it is not always necessary to place the aperture plate at the focal position, and the aperture plate is not always required. Even in the case where an aperture plate is not used, when an imaging lens is used, the aperture is limited by using an imaging lens, and hence the size of the aperture can be substantially determined (See FIG. 14). In FIG. 14, the imaging lens 316 has a size so that only light flux with a range of the detection light flux angle $\phi_3$ in the emitted light beam can pass through the imaging lens when the one-side telecentric optical system 314 is viewed from the optical grating 310 on the scale 306. In this case, when a diameter of the imaging lens 316 is indicated by D, the light source numerical aperture $NA_{light}$ is defined by Expression (26):

$$NA_{light}=\sin\{\tan^{-1}(D/2 \cdot a1)\}$$

When D≪a1, $$NA_{light} \approx D/(2 \cdot a1) \quad (26)$$

Figure 13:
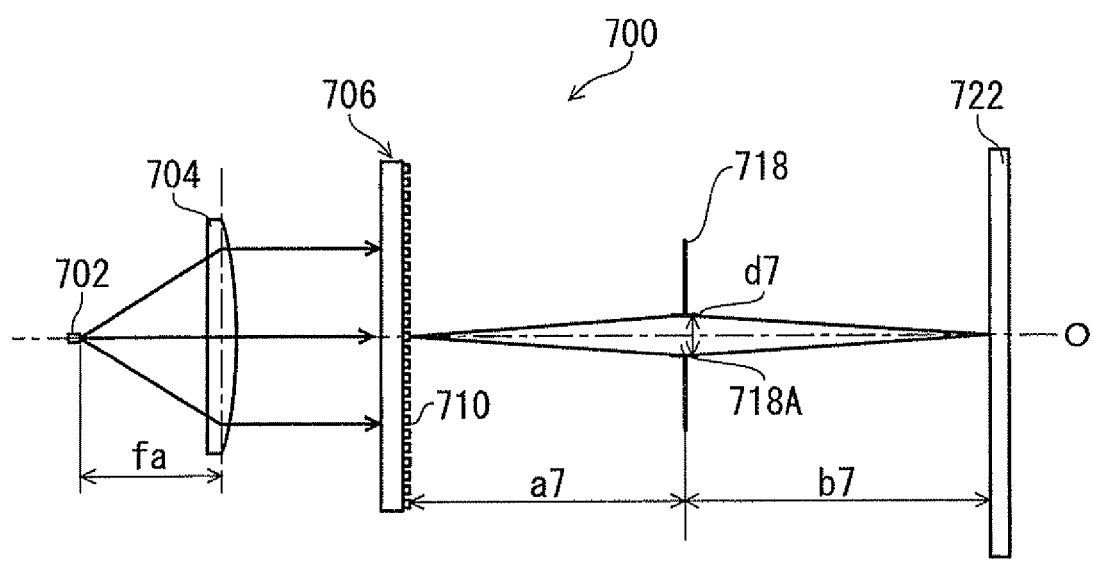
FIG. 13 is a schematic view showing a photoelectric encoder according to a seventh embodiment of the invention.

As shown in a seventh embodiment of FIG. 13, only an aperture plate 718 may be used without using a lens. Even when only the aperture plate 718 is used, the imaging function is exerted by an aperture 718A of the aperture plate, and an image of an optical grating 710 can be formed on the light receiving surface of a light receiving element 722. In this case, the production cost can be reduced as compared with any of the above-described embodiments, and man-hours for aligning the optical axis can be further reduced.

In the above-described embodiments, the collimator lens (illumination lens) is used as the illumination optical system. However, the invention is not limited to this. For example, a front aperture plate having a front aperture through which part of light emitted from the light source is allowed to transmit may be used as the illumination optical system. In this case, the illumination optical system can be configured at a lower cost, and alignment of the optical axis can be easily performed.

In the above-described embodiments, the photoelectric encoder is a linear encoder. However, the invention is not limited to this. For example, a rotary encoder may be configured.

The embodiments have been described as independent inventions, respectively. However, the invention is not limited to this, and any constituent elements may be adequately combined with each other.

In the above-described embodiments, the focal lengths fa, fb, fc are identical in all of the embodiments. Alternatively, specific values may be changed in each of the embodiments, or the focal lengths fa, fb, fc may be equal to one another.

What is claimed is:

1. A photoelectric encoder comprising:
    a light source configured to emit light;
    a scale having an optical grating that is disposed at constant intervals and being configured to modulate the light emitted from the light source by the optical grating;
    a light receiving element configured to detect the light modulated by the optical grating; and
    an imaging optical system configured to form an image of the light modulated by the optical grating,
    wherein the imaging optical system has a first aperture through which part of the light modulated by the optical grating is allowed to transmit,
        the first aperture having a size based on a cutoff spatial frequency, when the cutoff spatial frequency has a value between a fundamental spatial frequency of the optical grating obtained by a Fourier transformation and a second harmonic of the fundamental spatial frequency,
        the cutoff spatial frequency being a spatial frequency indicating a resolution limit of the imaging optical system due to the light emitted from the light source, and
    wherein the scale is inclined by an error angle $\delta\theta$ with respect to an optical axis O of the encoder due to a placement error of the scale, so that an upper flux angle $\theta_{4UP}$ at an upper side with respect to the incident main light beam originating from the light source, a light source flux angle $\theta_4$ of the incident main light beam originating from the light source, a detection light flux angle $\phi_4$ of an emission main light beam and the error angle $\delta\theta$ satisfy the expression: $\Theta_{4UP}=\theta_4-2\times\delta\theta>\phi_4$.

2. The photoelectric encoder according to claim 1, further comprising:
    an illumination optical system configured to illuminate the scale with the light emitted from the light source,
    wherein when a light source numerical aperture is smaller than a detection numerical aperture, the cutoff spatial frequency has a value which is obtained by dividing the detection numerical aperture by a wavelength of the light,
        the light source numerical aperture being based on (i) a distance from the light source to the illumination optical system, and (ii) a size of the light source, and
        the detection numerical aperture being based on (i) a distance from the optical grating to the imaging optical system, and (ii) a size of the aperture.

3. The photoelectric encoder according to claim 1, further comprising:
    an illumination optical system configured to illuminate the scale with the light emitted from the light source,
    wherein when a light source numerical aperture is larger than a detection numerical aperture, the cutoff spatial frequency has a value which is obtained by dividing a double of the detection numerical aperture by a wavelength of the light,
        the light source numerical aperture beign based on a distance from the light source to the illumination optical system, and a size of the light source, and
        the detection numerical aperture being based on a distance from the optical grating to the imaging optical system, and a size of the first aperture.

4. The photoelectric encoder according to claim 3, wherein, in accordance with an error angle which is produced by a placement error of the scale with respect to an optical axis of the imaging optical system, the distance from the light source to the illumination optical system is shortened, or the size of the light source is increased.

5. The photoelectric encoder according to claim 2, wherein the illumination optical system includes a second aperture plate having a second aperture through which part of the light emitted from the light source is allowed to transmit, or an illumination lens configured to deflect the light.

6. The photoelectric encoder according to claim 1, wherein the light source is placed on a same side as the imaging optical system with respect to the scale, and the imaging optical system forms an image of light reflected by the scale.

7. The photoelectric encoder according to claim 1, wherein the imaging optical system includes a first aperture plate in which the first aperture is disposed.

8. The photoelectric encoder according to claim 1, wherein the imaging optical system includes at least one imaging lens configured to deflect light modulated by the optical grating.

9. The photoelectric encoder according to claim 8, wherein the imaging optical system is formed as a one-side telecentric optical system in which the first aperture of the one first aperture plate is placed at a focal position of the one imaging lens on an optical axis.

10. The photoelectric encoder according to claim 8, wherein the imaging optical system is formed as a both-side telecentric optical system in which the first aperture of the one first aperture plate is placed at a focal position between at least two imaging lenses on an optical axis.

11. The photoelectric encoder according to claim 1, further comprising:
an illumination optical system configured to illuminate the scale with the light emitted from the light source,
wherein when a light source numerical aperture is substantially zero, the cutoff spatial frequency has a value which is obtained by dividing the detection numerical aperture by a wavelength of the light, the light source numerical aperture being based on a distance from the light source to the illumination optical system and a size of the light source.

12. The photoelectric encoder according to claim 1, wherein the light source is configured to emit light at a wavelength, and the encoder comprises a detection numerical aperture and wherein the cutoff spatial frequency satisfies the expression:

cutoff spatial frequency=2×detection numerical aperture/wavelength.

13. A method of determining an aperture size of a photoelectric encoder, the photoelectric encoder including a light source configured to emit light, a scale having an optical grating that is disposed at constant intervals and being configured to modulate the light emitted from the light source by the optical grating, a light receiving element configured to detect the light modulated by the optical grating, and an imaging optical system configured to form an image of the light modulated by the optical grating, wherein the imaging optical system has a first aperture through which part of the light modulated by the optical grating is allowed to transmit, the method comprising:
basing the size of the first aperture on a cutoff spatial frequency, when the cutoff spatial frequency has a value between a fundamental spatial frequency of the optical grating obtained by a Fourier transformation and a second harmonic of the fundamental spatial frequency,
the cutoff spatial frequency being a spatial frequency indicating a resolution limit of the imaging optical system due to the light emitted from the light source, and
inclining the scale by an error angle $\delta\theta$ with respect to an optical axis of the encoder due to a placement error of the scale, so that an upper flux angle $\theta_{4UP}$ at an upper side with respect to the incident main light beam originating from the light source, a light source flux angle $\theta_4$ of the incident main light beam originating from the light source, a detection light flux angle $\phi_4$ of an emission main light beam and the error angle $\delta\theta$ satisfy the expression: $\theta_{4UP}=\theta_4-2\times\delta\theta>\phi_4$.

* * * * *